(12) United States Patent
Johnson et al.

(10) Patent No.: US 8,653,939 B2
(45) Date of Patent: Feb. 18, 2014

(54) CODED WIRELESS KEY CARD SENSOR UNIT

(76) Inventors: Martin R. Johnson, Draper, UT (US); Jan F. Finlinson, Lindon, UT (US); Jeremy P. Willden, Pleasant Grove, UT (US); Robert E. Gooch, Orem, UT (US)

( * ) Notice: Subject to any disclaimer, the term of this patent is extended or adjusted under 35 U.S.C. 154(b) by 682 days.

(21) Appl. No.: 12/896,851

(22) Filed: Oct. 2, 2010

(65) Prior Publication Data

US 2011/0090046 A1    Apr. 21, 2011

Related U.S. Application Data

(60) Provisional application No. 61/248,418, filed on Oct. 2, 2009.

(51) Int. Cl.
*G05B 19/00*    (2006.01)

(52) U.S. Cl.
USPC ............. 340/5.67; 340/1.1; 340/5.1; 340/5.2; 340/5.6; 340/5.64

(58) Field of Classification Search
USPC ........... 340/1.1, 5.1, 5.2, 5.6, 5.64, 5.66, 5.67
See application file for complete search history.

(56) References Cited

U.S. PATENT DOCUMENTS

| 4,036,430 | A | * | 7/1977 | Eppich | 235/454 |
| 4,519,228 | A | * | 5/1985 | Sornes | 70/276 |
| 4,912,460 | A | * | 3/1990 | Chu | 340/5.67 |
| 5,355,701 | A | * | 10/1994 | Tobias | 70/394 |
| 8,193,906 | B2 | * | 6/2012 | Katagiri et al. | 340/5.67 |
| 2005/0095568 | A1 | * | 5/2005 | Musolf et al. | 434/308 |
| 2008/0094217 | A1 | * | 4/2008 | Okamasu et al. | 340/572.1 |
| 2009/0212903 | A1 | * | 8/2009 | Tamezane et al. | 340/5.2 |
| 2010/0025480 | A1 | * | 2/2010 | Nishizawa et al. | 235/492 |
| 2011/0022244 | A1 | * | 1/2011 | O'Callaghan | 700/297 |

* cited by examiner

*Primary Examiner* — Andrew Bee
(74) *Attorney, Agent, or Firm* — Angus C. Fox, III

(57) ABSTRACT

A coded wireless sensor unit has a slot sized to receive a key card. When a key card is inserted into the slot, the act of insertion generates a energy-harvested power pulse, which powers circuitry that reads electrical device control information coded on the key card and creates a first information packet signal that is transmitted by an on-board transmitter. The signal can be read by a receiver and relayed to a control unit which controls certain electrical devices which consume line power in response to received information packet signals. The control unit decodes received information packet signals and either turns on or activates the electrical devices in accordance with the decoded device control information. Removal of a key card can also be used to generate a power pulse, which creates a second information packet signal that is used to turn off or deactivate the electrical devices.

20 Claims, 15 Drawing Sheets

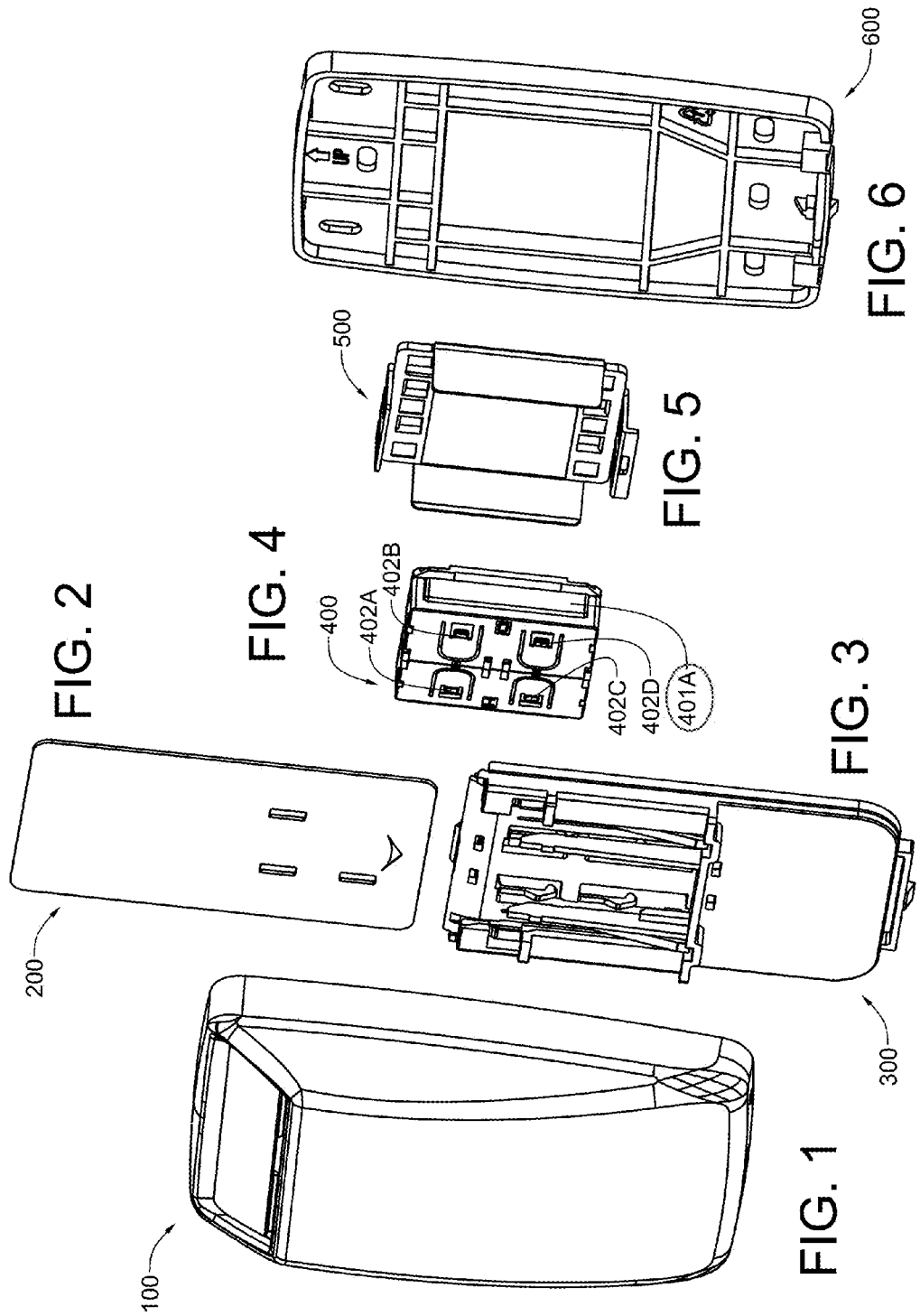

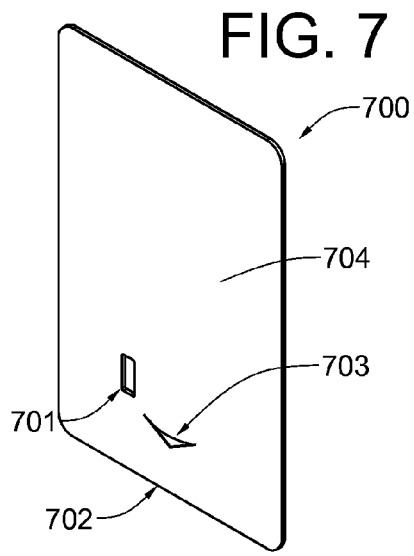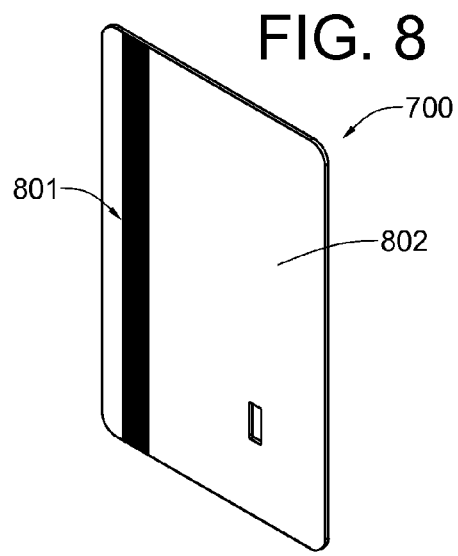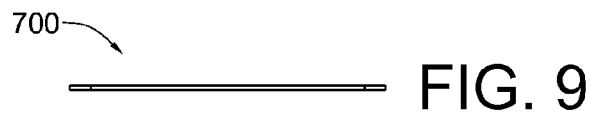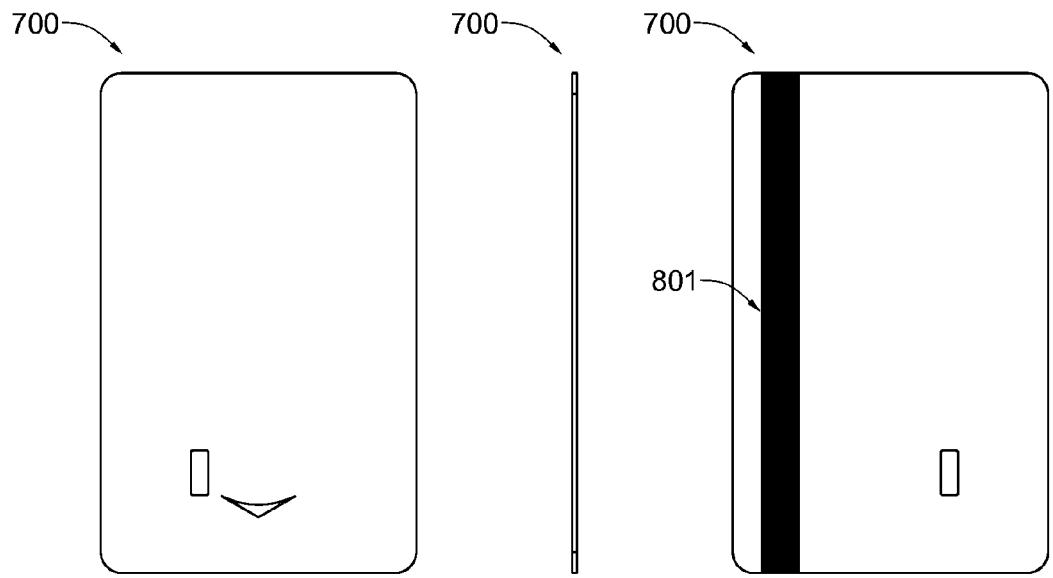

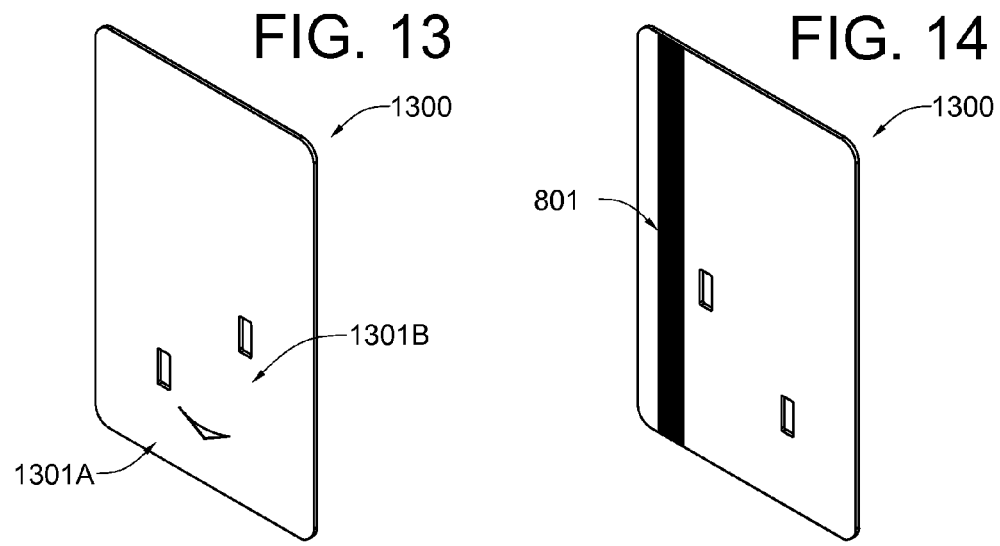
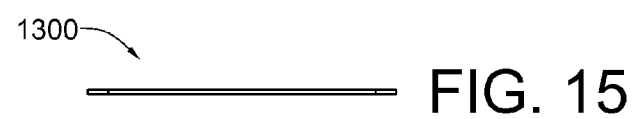
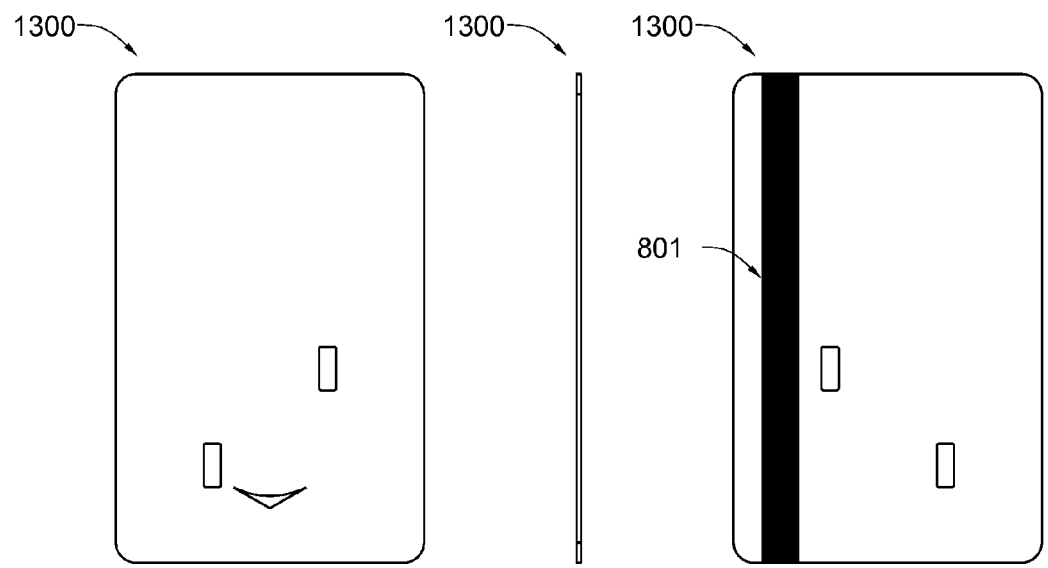
FIG. 13   FIG. 14   FIG. 15   FIG. 16   FIG. 17   FIG. 18

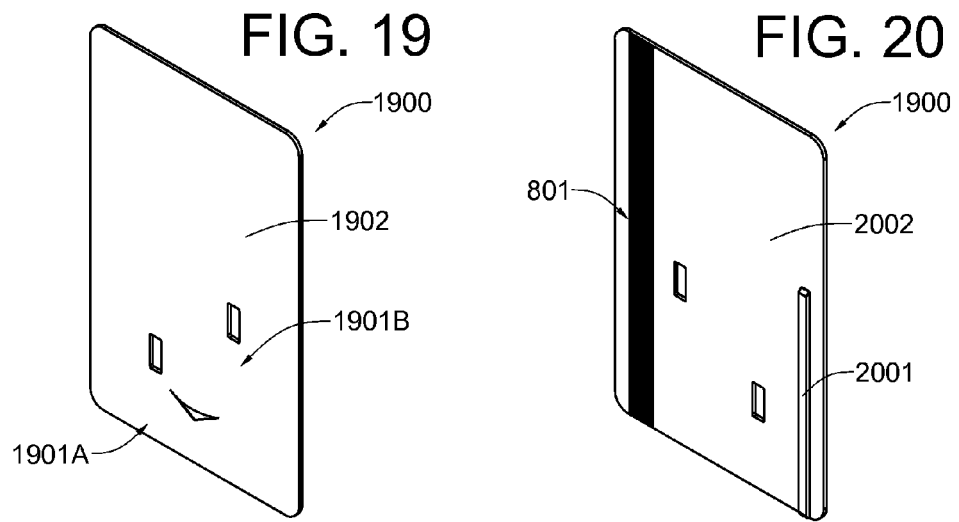
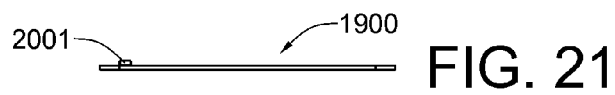
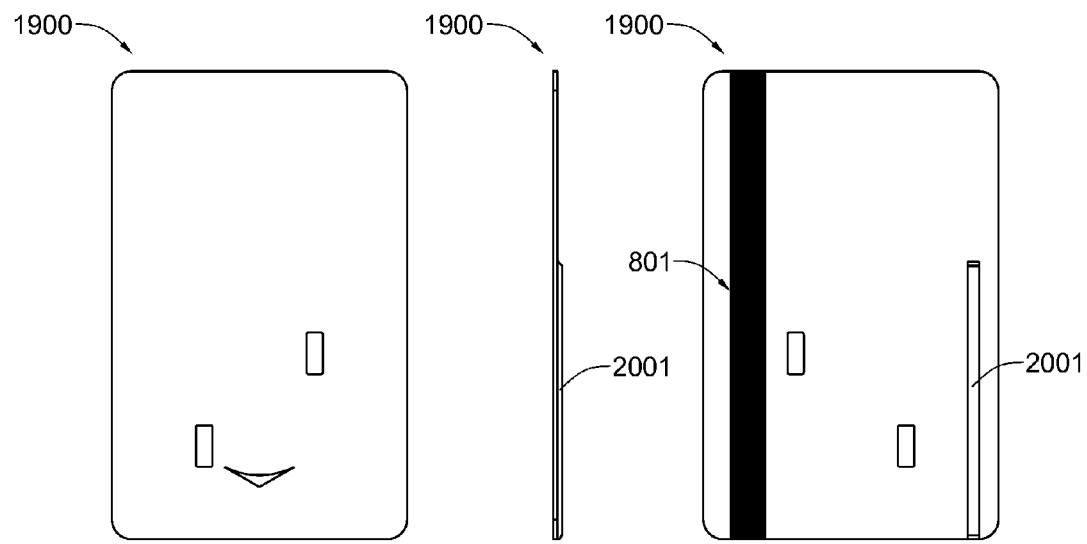
FIG. 19   FIG. 20
FIG. 21
FIG. 22   FIG. 23   FIG. 24

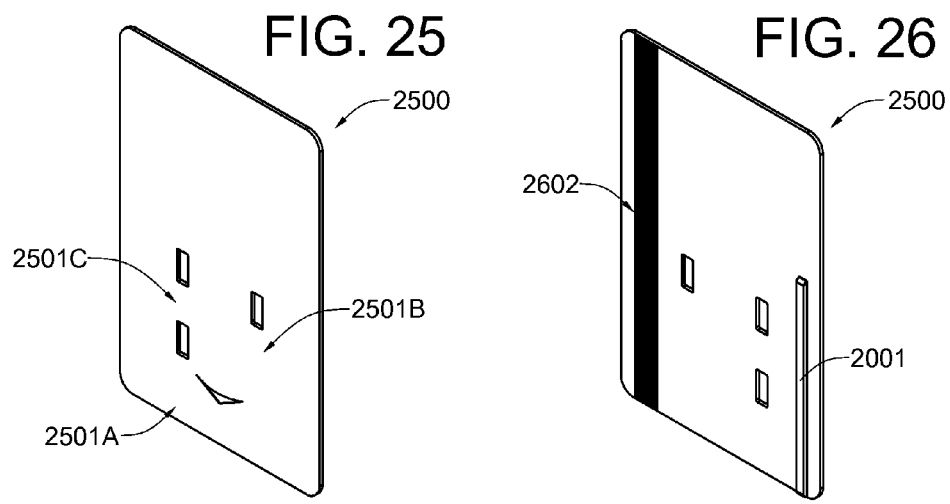
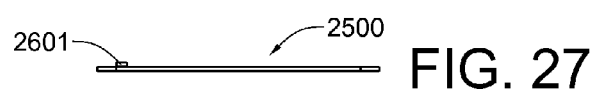
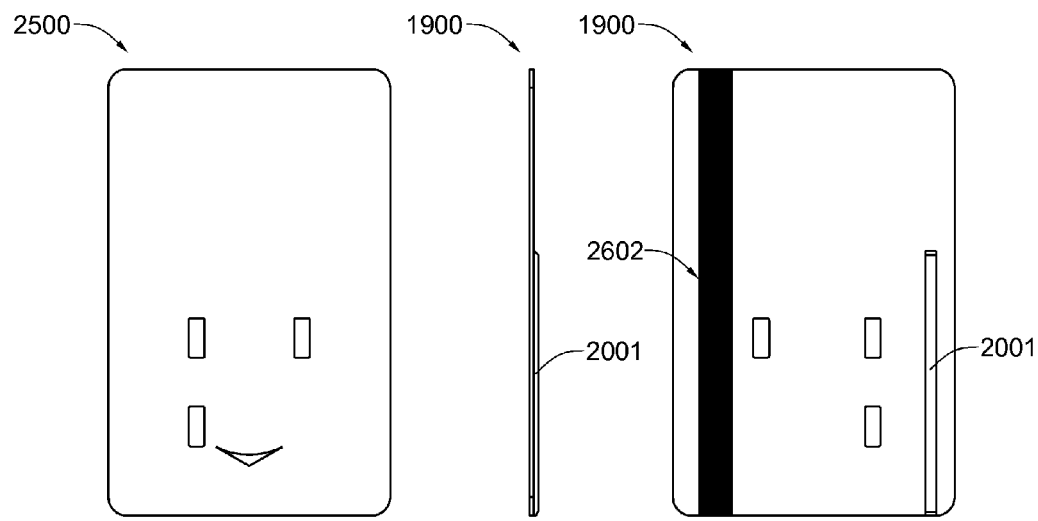

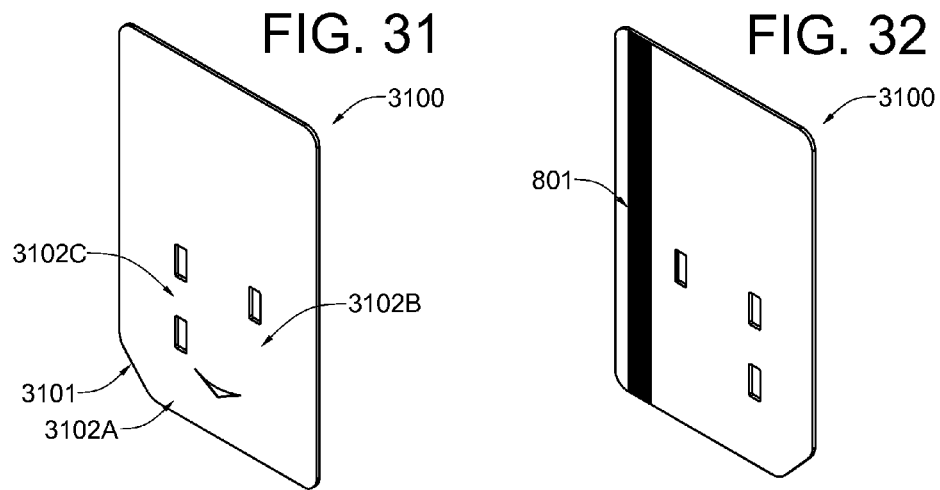
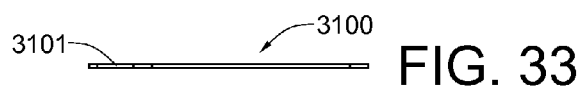
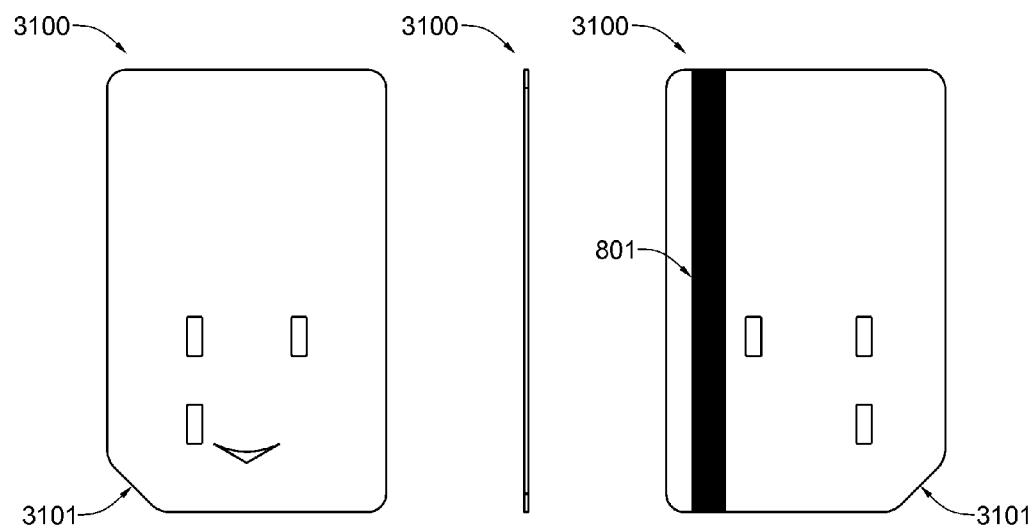

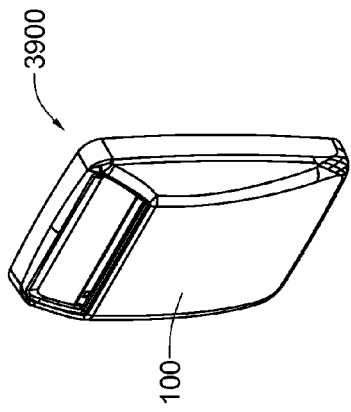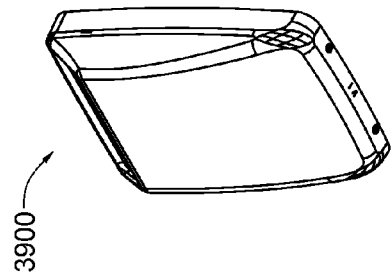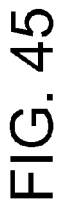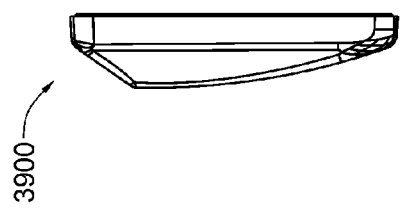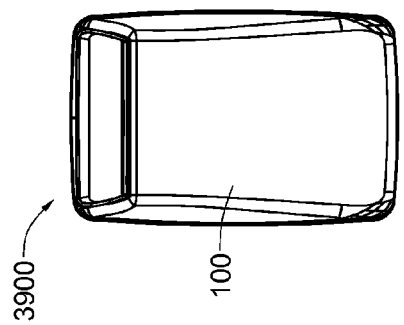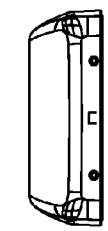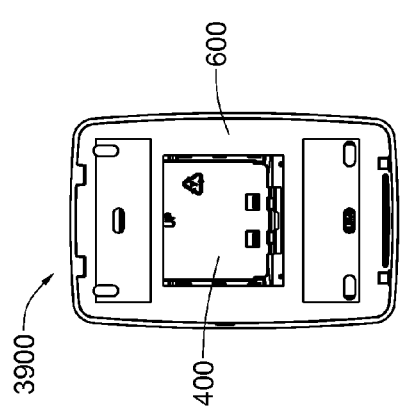

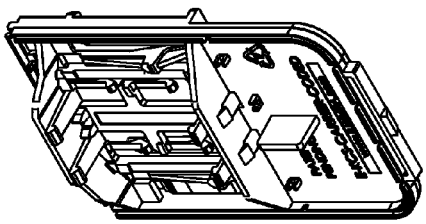
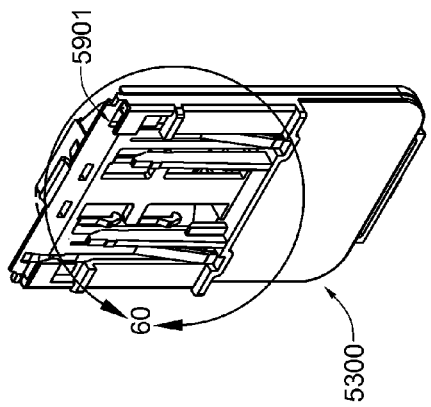
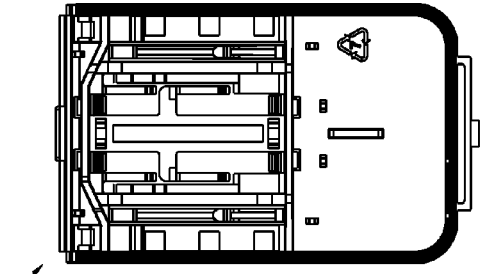
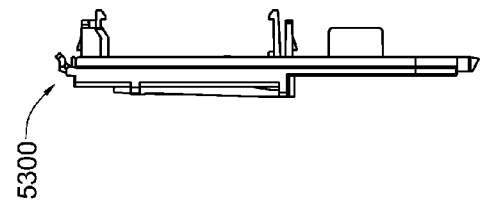
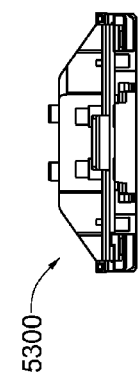
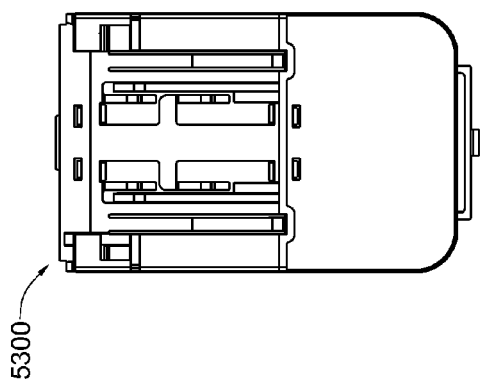
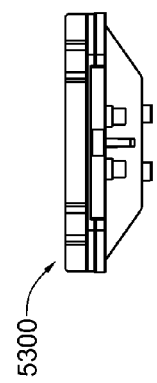

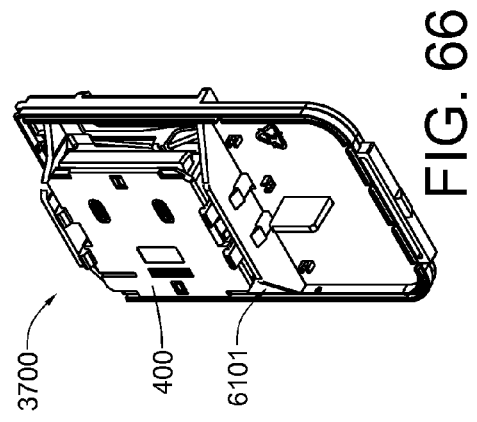
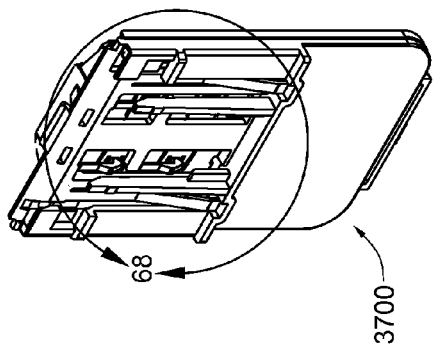
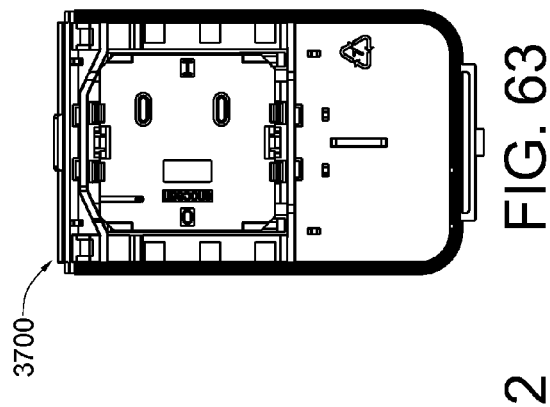
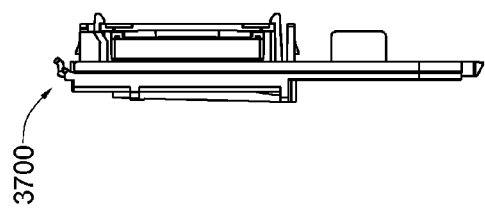
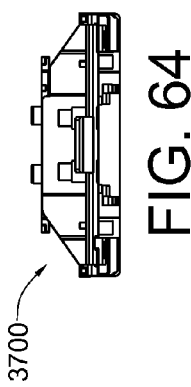
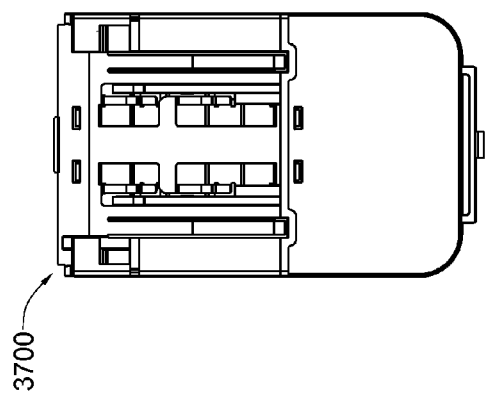
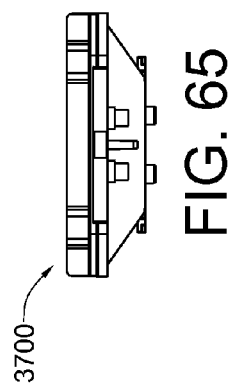

CODED WIRELESS KEY CARD SENSOR UNIT

This application has a priority date based on Provisional Patent Application No. 61/248,418, which has a filing date of Oct. 2, 2009, and bears the same title.

BACKGROUND OF THE INVENTION

1. Field of the Invention

The present invention relates generally, to electrical control systems. More specifically, the invention relates to wireless systems activated by a coded key card for energy management and/or control of line-powered devices.

2. History of the Prior Art

It is commonly difficult, costly and/or impractical to install wires between existing controlled electrical systems/circuits and new controlled electrical device(s). The level of difficulty and/or impracticality may be attributable to the need to damage or demolish ceilings, floors, or walls, in order to run control wires. Labor costs for installing new wiring can be considerable. This is particularly true if a team of electricians is required to perform the job.

As a wireless alternative to installing new wiring does not suffer from the aforesaid disadvantages, such an alternative may be advantageous if the utility of the wired and wireless solutions are substantially equivalent. In fact, a wireless control system may confer additional capability and/or convenience compared to hard-wired systems. Various methods and/or systems have been proposed, which attempt to overcome some of the difficulties/impracticalities mentioned above (see reference patents). Unfortunately, these methods fall short of addressing the wide variety of circumstances which may be encountered when designing, installing, deploying, and commissioning such systems. Moreover, they do not allow for flexibility in connecting to or interfacing with other systems. Further, they are restricted to specific applications or installation scenarios. Further still, their system architectures do not allow the system to be easily scaled up or down, as system needs evolve or change. In fact, they may even require ongoing maintenance, much of which can be eliminated.

One particular application involving wireless communication involves the use of a key card generally having the rectangular shape and dimensions of a typical credit card, which are 54 mm×86 mm, or about 2⅛ inches×3⅜ inches. The key card is inserted in a slot of a key card holder/detector that is typically mounted to an interior wall of a hotel room. When a key card is inserted in the holder/detector, a first signal is sent to a control circuit, which can perform one or more functions, such as turning on lights, turning on a heating/air conditioning system, activating a TV system. When the key card is removed from the holder/detector, a second wireless signal is sent to the control circuit, which then typically performs reverse functions, such as turning off the lights, turning off the heating/air conditioning system, and deactivating a TV system. The primary function of prior art key card holder/detectors is to lower energy costs for the hotelier by minimizing energy consumption in the room when guests are not present. Because early key card holder/detectors were hard wired, their use was primarily limited to new construction, as installation of these devices in an already completed structure required the running of wiring through the walls. Although the latest key card holder/detectors use wireless signals to communicate with the control circuit, they have several significant drawbacks. The first is that the signal that is sent is indicative only of either the presence or absence of a key card. The second is that the prior art key car holder/detectors works with any plastic card having the standard 54 mm×86 mm dimensions, whether it be a key card, credit card, customer loyalty card, etc. Thus, the function of the key card holder/detector can be easily defeated by inserting a non-key card into the holder/detector when the guests leave the room, thereby overriding the energy saving function of the device.

SUMMARY OF THE INVENTION

The present invention provides a coded wireless key card sensor unit that is responsive only to cards which have been specifically programmed for the device with a unique code. Thus, a sensor within a key card holder detects not only the insertion or removal of a card, but also looks for the presence of codes which have been programmed into the card. This enables the generation and transmission of wireless signals which correspond to the particular code which has been programmed into the card. The invention, thus, enables different code sets to be programmed onto a particular key card. Different codes enable the implementation of usage logging as a function of the various available code combinations. For example, different categories of hotel personnel can be issued key cards having different key codes. A key card issued to cleaning employees likely would not be coded for TV or heating/air conditioning system activation. The system can be programmed to trigger an alarm if improperly-coded cards are used at unexpected times. The system can be defeated only by counterfeiting the codes on the card. By using coded key cards, it is possible to keep track of which cards were used and at what times. This gives administrators the ability to track usage. Because the key card holder/detector of the present invention transmits wireless signals, it can be mounted on walls using double sided tape, screws or various other types of fasteners, and without the need for running wires or cutting into walls.

For one presently manufactured embodiment of the invention, a coded wireless key card sensor unit includes a slot for receiving a key card, an energy harvesting feature which provides a power pulse when a card is inserted in the slot, one or more sensors which can be activated by physical features programmed into a key card, a circuit energized by the power pulse which identifies the particular sensors that have been activated by an inserted key card and generates an information packet which contains codes corresponding to the activated sensors, and a transmitter that is energized by the power pulse and which transmits a radio signal containing the information packet. Although the physical features on the key card are most easily provided with a pattern of punched holes, other physical features, such as raised bumps on the card or magnetic coding may also be used. The use of magnetic coding adds complexity to the system, as it is difficult to read a magnetically coded strip using common energy harvesting pulse generators. Although electro-chemical power sources, such as cells and batteries may be used for such an application, they have the disadvantage of requiring periodic replacement.

BRIEF DESCRIPTION OF THE DRAWINGS

FIG. 1 is an isometric view of the front cover of the coded wireless key card sensor unit;

FIG. 2 is an isometric view of a punched card;

FIG. 3 is a an isometric view of the carrier of the coded wireless key card sensor unit;

FIG. 4 is an isometric view of the electronic module of the coded wireless key card sensor unit;

FIG. 5 is an isometric view of the retainer clip of the coded wireless key card sensor unit;

FIG. 6 is an isometric view of the back plate of the coded wireless key card sensor unit;

FIG. 7 is a primarily front, isometric view of a key card having a single punched hole therein;

FIG. 8 is a primarily rear, isometric view of a key card having a single punched hole therein;

FIG. 9 is a top or bottom plan view of a key card having a single punched hole therein;

FIG. 10 is a front elevational view of a key card having a single punched hole therein;

FIG. 11 is a right-side or left-side elevational view of a key card having a single punched hole therein;

FIG. 12 is a rear elevational view of a key card having a single punched hole therein;

FIG. 13 is a primarily front, isometric view of a key card having two, diagonally-oriented punched holes therein;

FIG. 14 is a primarily rear, isometric view of a key card having two, diagonally-oriented punched holes therein;

FIG. 15 is a top or bottom plan view of a key card having two, diagonally-oriented punched holes therein;

FIG. 16 is a front elevational view of a key card having two, diagonally-oriented punched holes therein;

FIG. 17 is a right-side or left-side elevational view of a key card having two, diagonally-oriented punched holes therein;

FIG. 18 is a rear elevational view of a key card having two, diagonally-oriented punched holes therein;

FIG. 19 is a primarily front, isometric view of a non-reversible key card having an asymmetry rib and two, diagonally-oriented punched holes therein;

FIG. 20 is a primarily rear, isometric view of a non-reversible key card having an asymmetry rib and two, diagonally-oriented punched holes therein;

FIG. 21 is a top or bottom plan view of a non-reversible key card having an asymmetry rib and two, diagonally-oriented punched holes therein;

FIG. 22 is a front elevational view of a non-reversible key card having an asymmetry rib and two, diagonally-oriented punched holes therein;

FIG. 23 is a right-side or left-side elevational view of a non-reversible key card having an asymmetry rib and two, diagonally-oriented punched holes therein;

FIG. 24 is a rear elevational view of a non-reversible key card having an asymmetry rib and two, diagonally-oriented punched holes therein;

FIG. 25 is a primarily front, isometric view of a non-reversible key card having an asymmetry rib and three punched holes therein;

FIG. 26 is a primarily rear, isometric view of a non-reversible key card having an asymmetry rib and three punched holes therein;

FIG. 27 is a top or bottom plan view of a non-reversible key card having an asymmetry rib and three punched holes therein;

FIG. 28 is a front elevational view of a non-reversible key card having an asymmetry rib and three punched holes therein;

FIG. 29 is a right-side or left-side elevational view of a non-reversible key card having an asymmetry rib and three punched holes therein;

FIG. 30 is a rear elevational view of a non-reversible key card having an asymmetry rib and three punched holes therein;

FIG. 31 is a primarily front, isometric view of a non-reversible key card having an asymmetry chamfer and three punched holes therein;

FIG. 32 is a primarily rear, isometric view of a non-reversible key card having an asymmetry chamfer and three punched holes therein;

FIG. 33 is a bottom plan view of a non-reversible key card having an asymmetry chamfer and three punched holes therein;

FIG. 34 is a front elevational view of a non-reversible key card having an asymmetry chamfer and three punched holes therein;

FIG. 35 is a right-side or left-side elevational view of a non-reversible key card having an asymmetry chamfer and three punched holes therein;

FIG. 36 is a rear elevational view of a non-reversible key card having an asymmetry chamfer and three punched holes therein;

FIG. 39 is a front elevational view of a coded wireless key card sensor unit having no key card inserted therein;

FIG. 40 is a rear elevational view of a coded wireless key card sensor unit having no key card inserted therein;

FIG. 41 is a right-side elevational view of a coded wireless key card sensor unit having no key card inserted therein;

FIG. 42 is a top plan view of a coded wireless key card sensor unit having no key card inserted therein;

FIG. 43 is a bottom plan view of a coded wireless key card sensor unit having no key card inserted therein;

FIG. 44 is an isometric view from a top/right-side vantage point of a coded wireless key card sensor unit having no key card inserted therein;

FIG. 45 is an isometric view from a bottom/right-side vantage point of a coded wireless key card sensor unit having no key card inserted therein;

FIG. 53 is a front elevational view of the carrier of a coded wireless key card sensor unit;

FIG. 54 is a right-side elevational view of the carrier of a coded wireless key card sensor unit;

FIG. 55 is a rear elevational view of the carrier of a coded wireless key card sensor unit;

FIG. 56 is a top plan view of the carrier of a coded wireless key card sensor unit;

FIG. 57 is a bottom plan view of the carrier of a coded wireless key card sensor unit;

FIG. 58 is an isometric view, from a bottom/right-side vantage point, of the carrier of a coded wireless key card sensor unit;

FIG. 59 is an isometric view, from a top/right-side vantage point, of the carrier of a coded wireless key card sensor unit;

FIG. 61 is a front elevational view of the carrier and electronic module assembly of a coded wireless key card sensor unit;

FIG. 62 is a right-side elevational view of the carrier and electronic module assembly of a coded wireless key card sensor unit;

FIG. 63 is a rear elevational view of the carrier and electronic module assembly of a coded wireless key card sensor unit;

FIG. 64 is a top plan view of the carrier and electronic module assembly of a coded wireless key card sensor unit;

FIG. 65 is a bottom plan view of the carrier and electronic module assembly of a coded wireless key card sensor unit;

FIG. 66 is an isometric view, from a bottom/right-side vantage point, of the carrier and electronic module assembly of a coded wireless key card sensor unit;

FIG. 67 is an isometric view, from a top/right-side vantage point, of the carrier and electronic module assembly of a coded wireless key card sensor unit;

DETAILED DESCRIPTION OF THE PREFERRED EMBODIMENT(S)

Figure 38:
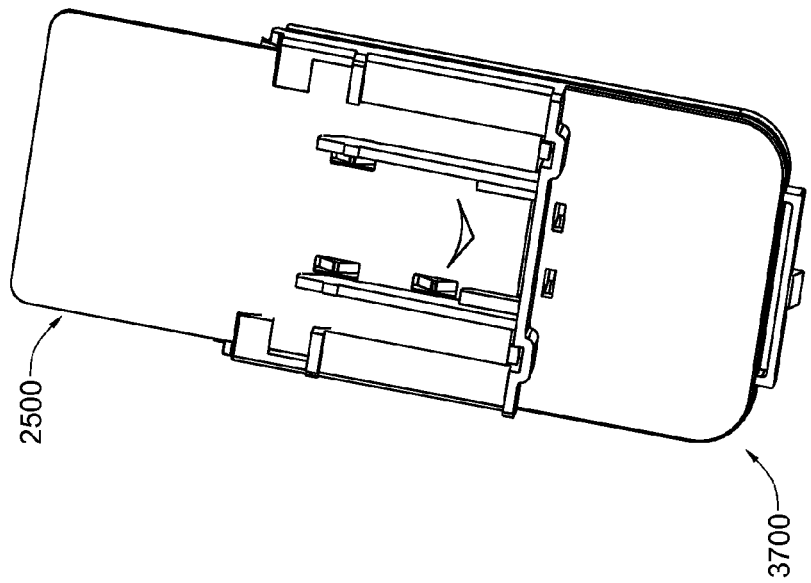
FIG. 38 is an isometric view of the carrier of a coded wireless key card sensor unit and of a key card that has been inserted into the carrier slot.

The various aspects of the invention will be now be described in detail with reference to the attached drawing figures.

FIGS. 1 through 6 are, essentially, an exploded view of the coded wireless key card sensor unit fabricated in accordance with the present invention. FIG. 1 is a front cover 100. FIG. 2 is a coded key card 200 having a pattern of three spaced-apart apertures punched therein. The key card may also be magnetically coded so that it can open a magnetically-encoded lock, such as those which are commonly used to secure the doors of hotel rooms. FIG. 3 is a carrier 300, which has a slot into which the coded key card slides. FIG. 4 is an energy harvesting electronic module 400 which includes four micro switches, a kinetic-energy harvesting electrical power pulse generator powered by card insertion into or card removal out of the carrier slot, a microprocessor, which is energized by a generated power pulse, and that identifies the particular micro switches, if any, that have been activated by an inserted key card and that further generates an information packet which codes for the activated micro switches, and a transmitter that is also energized by the power pulse and which transmits a radio signal containing the information packet. The module incorporates an activator bow with an activator tab at each end thereof. Only one activator tab 401A is visible in this view; the other activator tab 401B is positioned on the opposite side of the module 400. The kinetic-energy harvesting electrical power pulse generator is triggered by pushing on one or both activator tabs 401A and 401B. The pulse generator comprises a multi-winding coil having a ferrite loop switchable between two states that incorporates a neodymium-iron-boron permanent magnet. A power pulse is generated by a reversal of magnetic flux within the ferrite loop when it switches states. Each time flux reversal occurs in the pulse generator, the current in the multi-winding coil reverses direction. The micro switch pushbuttons 402A, 402B, 402C and 402D, which are exposed on the front of the module 400, are arranged in a rectangular pattern (i.e., each of the pushbuttons is positioned at the corner of a rectangle). For a preferred embodiment of the invention, the electronic module 400 is a PTM 200 Pushbutton Transmitter Module sourced from enOcean GmbH of Oberhaching, Germany. FIG. 5 is a retainer 500 that secures the electronic module to the back of the carrier. Finally, FIG. 6 is a back plate 600 having a plurality of apertures that enable it to be affixed to a wall. The electronic module 400 fits into a recess within the back plate 600. The retainer 500 snaps onto the rear of the carrier 300, thereby holding the electronic module 400 in place. The carrier 300 snaps into the front cover 100, and the front cover 100 snaps onto the back plate 600.

Referring now to FIGS. 7 through 12, a first embodiment key card 700 has a single punched rectangular aperture or cutout 701, or hole, on the left half of the key card 700 near a bottom edge 702 thereof. An arrow 703 on the front major face 704 of the key card 700 enables a user to insert the key card 700 into either the reader slot of the security lock or into a coded wireless key card sensor unit. The first embodiment key card 700 also has a magnetically-encoded strip 801 on a rear major face 802 that can be programmed to open a security lock when the strip 801 is read by sliding the key card 700 into the security lock. It should be emphasized that each rectangular aperture 701 prevents one of the micro switch pushbuttons 402A, 402B, 402C or 402D from being activated. This first embodiment key card 700 is designed to activate three of the four microswitches (particularly the switches activated by pushbuttons 402A, 402B, and 402D). However, as this card can be reversed, it could also activate pushbuttons 402A, 402B, and 402C.

Referring now to FIGS. 13 through 18, a second embodiment key card 1300 has a pair of diagonally oriented punched apertures 1301A and 1301B positioned on the bottom third of the key card 1300. This second embodiment key card 1300 is designed to activate two of the four microswitches (particularly the switches activated by pushbuttons 402A and 402D). However, as this card can be reversed, it could also activate pushbuttons 402B and 402C.

Referring now to FIGS. 19 through 24, a third embodiment non-reversible key card 1900 has an asymmetry rib 2001 and two, diagonally-oriented punched apertures, or cutouts 1901A and 1901B positioned on the bottom third of the key card 1900. The rib 2001 mates with a groove in the key card sensor carrier and prevents the card from being inserted in the carrier with the front major face 1902 and the back major face 2002 reversed. This third embodiment key card 1900 is designed to activate two of the four microswitches (particularly the switches activated by pushbuttons 402A and 402D).

Referring now to FIGS. 25 through 30, a fourth embodiment non-reversible key card 2500 has an asymmetry rib 2601 and three spaced-apart punched apertures 2501A, 2501B and 2501C positioned on the bottom third of the key card 2500. Each of the apertures is positioned at the approximate corners of a square, with two apertures on top and one on the bottom left side of the key card 2500. This fourth embodiment key card 2500 is designed to activate only the microswitch activated by pushbutton 402D.

Referring now to FIGS. 31 through 36, a fifth embodiment non-reversible key card 3100 has an asymmetry chamfer 3101 on a bottom left hand corner of the key card 3100. When the key card 3100 is reversed, a corner filler in the left bottom corner of the key card slot prevents the card 3100 from being fully inserted so that the punched apertures will not align with the micro switches of the electronic module 400. The fifth embodiment non-reversible key card 3100 also has three spaced-apart punched apertures 3102A, 3102B and 3102C positioned on the bottom third of the key card 3100. Each of the apertures is positioned at the approximate corners of a square, with two apertures on top and one on the bottom left side of the key card 3100. This fifth embodiment key card 3100 is designed to activate only the microswitch activated by pushbutton 402D.

Figure 37:
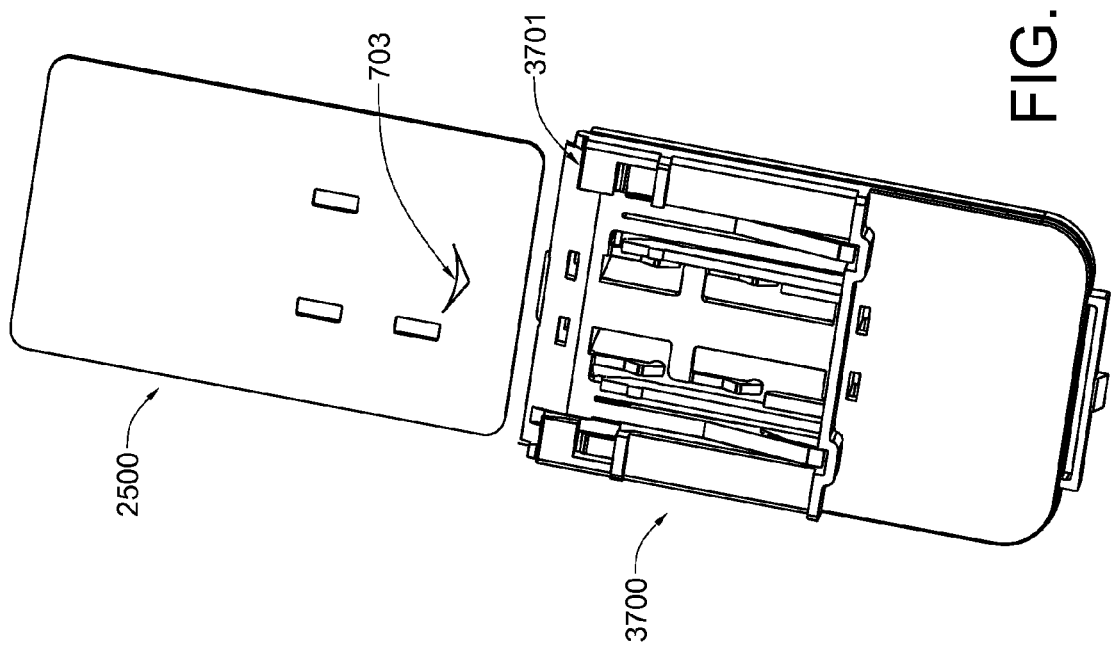
FIG. 37 is an isometric view of the carrier of a coded wireless key card sensor unit and of a key card prior to its insertion into the carrier slot.
Figure 51:
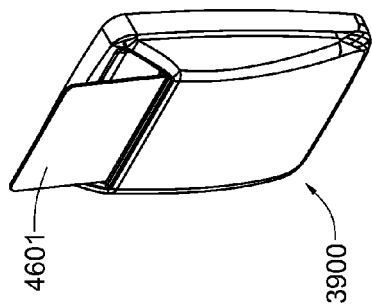
FIG. 51 is an isometric view, from a top/right-side vantage point, of a coded wireless key card sensor unit having a key card inserted therein.
Figure 52:
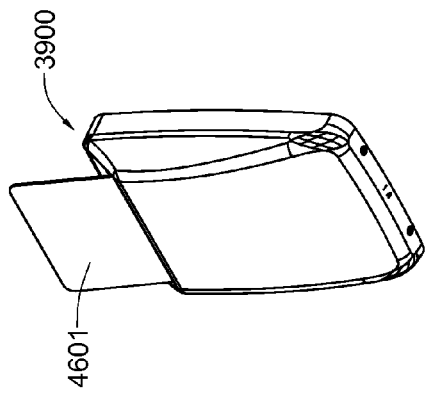
FIG. 52 is an isometric view, from a bottom/right-side vantage point, of a coded wireless key card sensor unit having a key card inserted therein.
Figure 48:
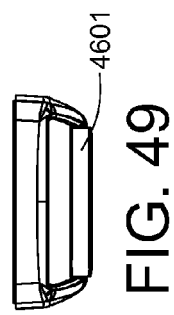
FIG. 48 is a right-side elevational view of a coded wireless key card sensor unit having a key card inserted therein.
Figure 49:
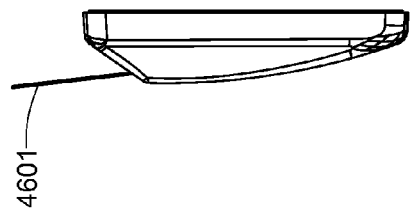
FIG. 49 is a top plan view of a coded wireless key card sensor unit having a key card inserted therein.
Figure 46:
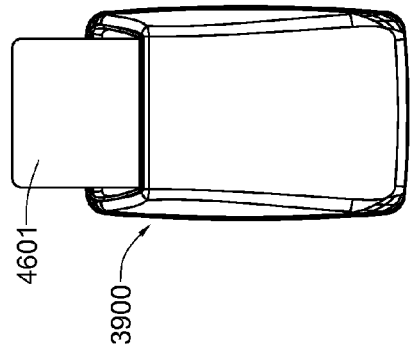
FIG. 46 is a front elevational view of a coded wireless key card sensor unit having a key card inserted therein.
Figure 50:
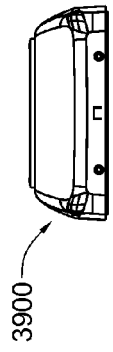
FIG. 50 is a bottom plan view of a coded wireless key card sensor unit having a key card inserted therein.
Figure 47:
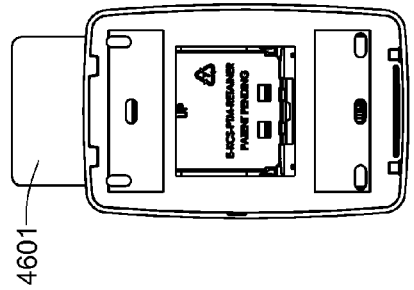
FIG. 47 is a rear elevational view of a coded wireless key card sensor unit having a key card inserted therein.

Referring now to FIG. 37, the carrier/electronic module/retainer assembly 3700 of a coded wireless key card sensor unit is shown with a key card 2500 having three punched apertures, ready for insertion in the carrier slot 3701. If the card is inserted with the arrow 703 facing down and forward, or if it is equipped with an asymmetry rib 2001 or an asymmetry chamfer 3101, only the microswitch activated by pushbutton 402D will be activated.

Referring now to FIG. 38, the key card 2500 has been inserted in the carrier slot 3701 of the carrier/electronic module/retainer assembly 3700 of FIG. 37.

Referring now to FIGS. 39 through 45, a completely assembled coded wireless key card sensor unit 3900 having no key card inserted therein is shown in various views. The carrier/electronic module/retainer assembly 3700 of FIGS. 37 and 38 is sandwiched between the front cover 100 of FIG. 1 and the back plate 600 of FIG. 6.

Referring now to FIGS. 46 through 52, a key card 4601 has been inserted in the completely assembled coded wireless key card sensor unit 3900 of FIGS. 39 through 45. The coded wireless key card sensor unit 3900 and the inserted card 4601 are shown in a variety of different views.

Referring now to FIGS. 53 through 59, a carrier 5300 of the coded wireless key card sensor unit is shown in seven different views. The carrier 5300 has a slot 5901 into which a key card can be inserted.

Figure 60:
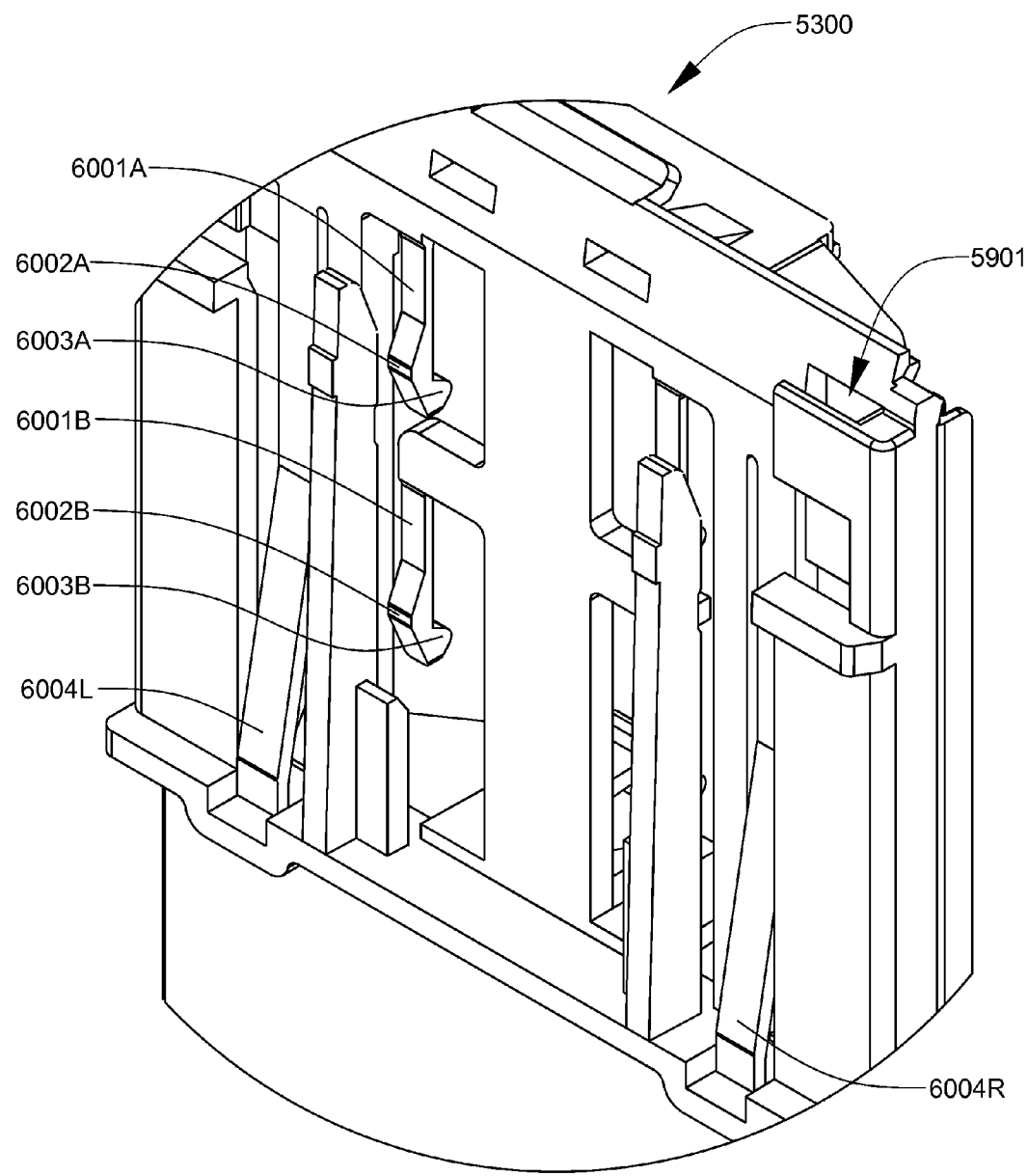
FIG. 60 is an enlarged view of the encircled area of FIG. 59.

Referring now to FIG. 60, the enlarged view of the encircled area of FIG. 59 shows the positioning of multiple resilient backing fingers 6001A and 6001B, which are unitary with the carrier 5300. There are also two other resilient backing fingers on the opposite side of the module which are not fully visible in this view. When a key card 200 is inserted in the slot 5901, the backing fingers 6001A and 6001B are displaced rearward by pressure of the key card against the ramped projections 6002A and 6002B, respectively. If there is a punched aperture positioned over a ramped projection as the key card reaches its fully inserted position, the associated backing finger will have moved forward before the electric energy pulse is generated by the full insertion of the key card. The resilient activator arms 6004L and 6004R are designed to trigger the kinetic-energy harvesting electrical power pulse generator within the electronic module 400 by depressing the activator tabs 401A and 401B after the ramped projections 6002A and 6002B have attained their final positions, as determined by the punchings on the key card 200. When the key card 200 is removed from the slot 5901, another power pulse is generated as the activator tabs 401A and 401B at opposite ends of the energy bow return to their original positions. The power pulse generated upon insertion of the key card 200 is of opposite polarity as the power pulse generated upon removal of the key card 200.

Referring now to FIGS. 61 through 67, a carrier/electronic module/retainer assembly 3700 is shown in seven different views. The electronic module 400 clips into a socket 6101 on the carrier 300 and the retainer 500 reinforces the assembly so that the electronic module 400 will not detach from the carrier 300.

Figure 68:
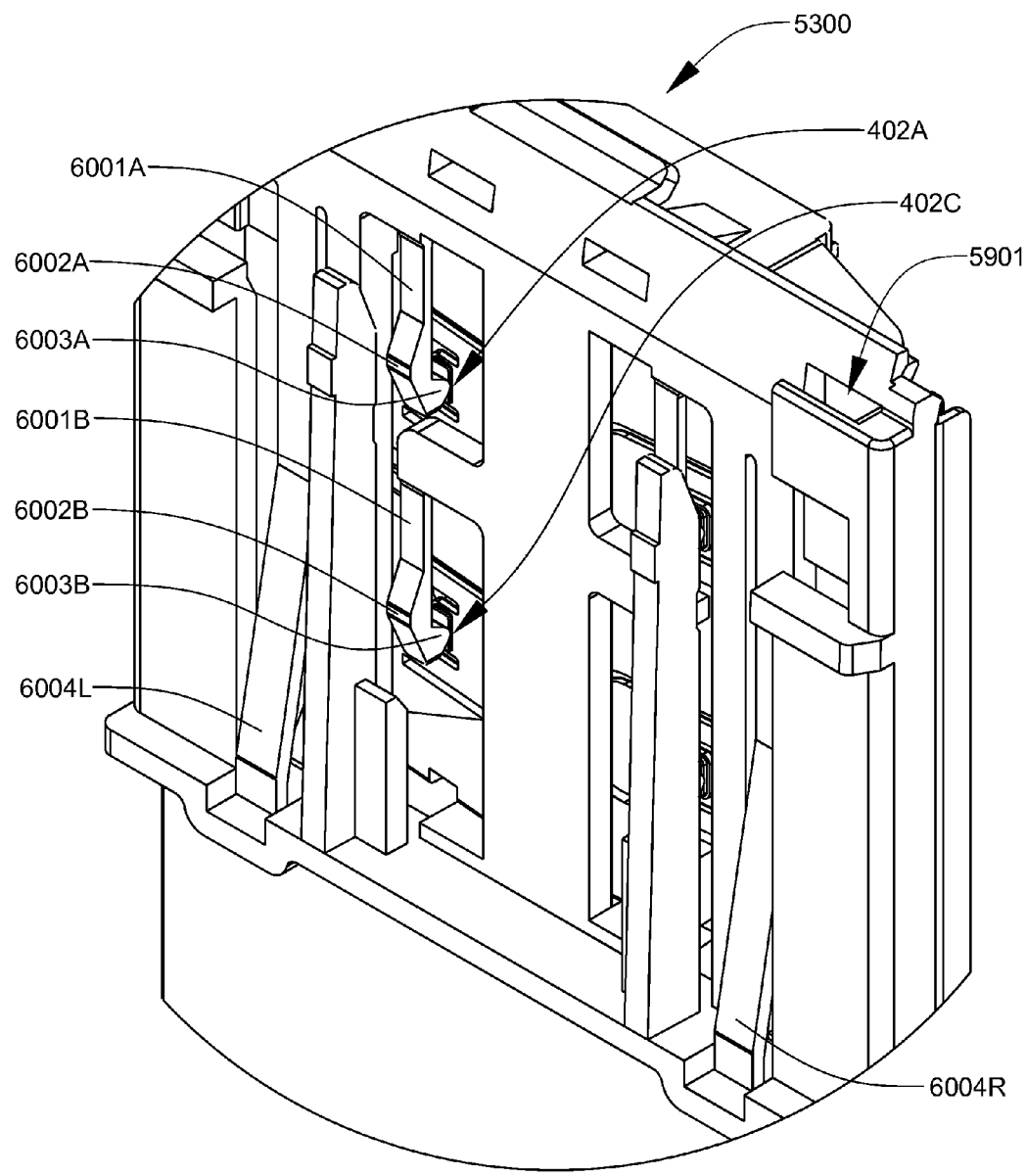
FIG. 68 is an enlarged view of the encircled area of FIG. 67.

Referring now to FIG. 68, the enlarged view of the encircled area of FIG. 67 shows how the electronic module 400 fits into the socket 6101 and how the microswitch pushbuttons 402A, 402B, 402C and 402D (only pads 402A and 402C are clearly visible in this view) on the module 400 are positioned directly behind the rearward facing projections 6003A and 6003B of resilient backing fingers 6001A and 6001B, respectively. It should be understood that the carrier 300 and the electronic module 400 are bilaterally symmetrical.

Figures 69, 70:
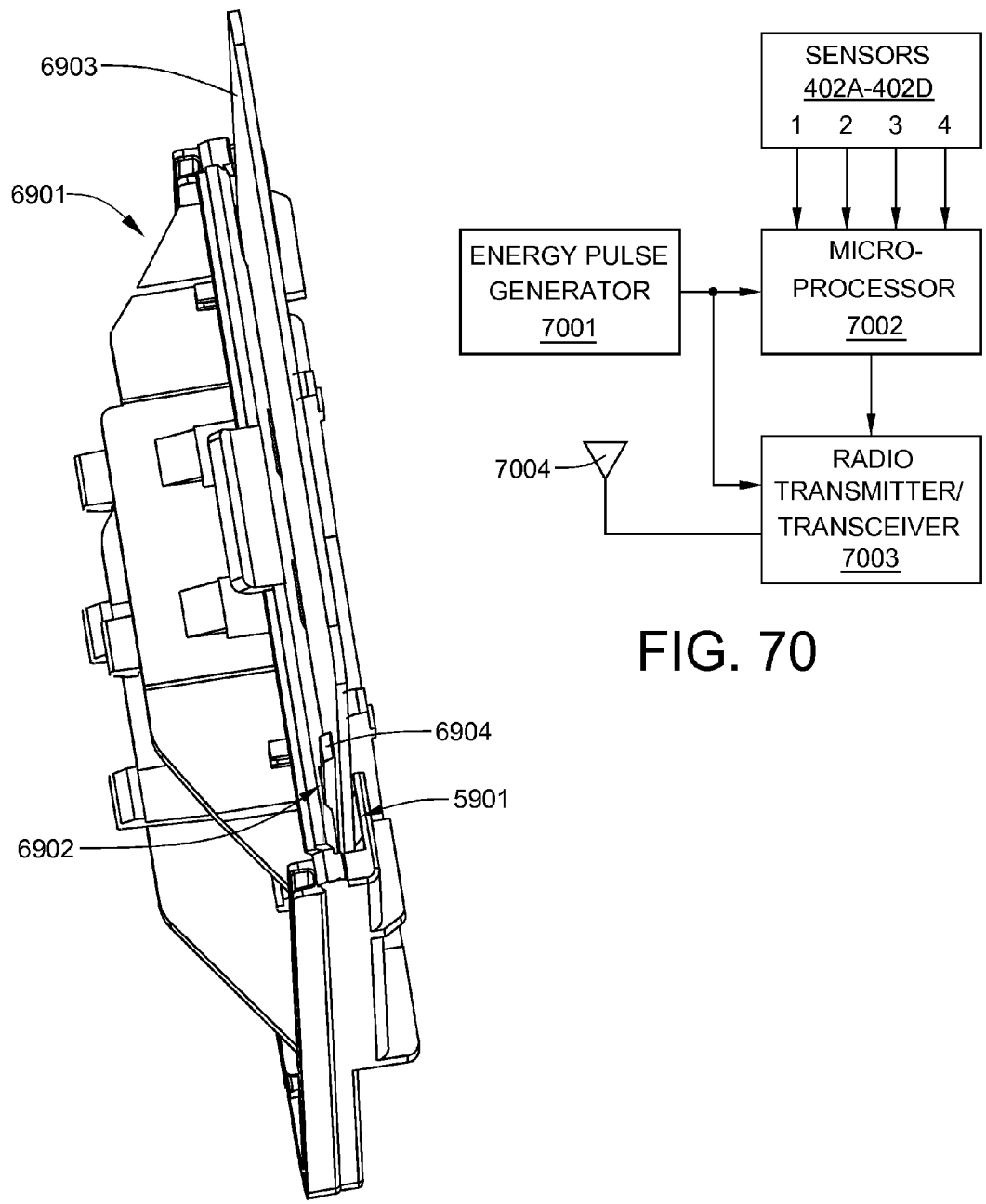
FIG. 69 is an isometric view, from a top/rear/left-side vantage point, of a carrier of a coded wireless key card sensor unit having a slot with an anti-symmetry groove into which a card having an anti-symmetry rail has been inserted.
FIG. 70 is a simplified block diagram of the electronic module of FIG. 4.

Referring now to FIG. 69, a carrier 6901 having a card slot 5901 with an anti-symmetry groove 6902 is shown. As a key card 6903 slides into the card slot 5901, the anti-symmetry rail 2001 on the card slides into the anti-symmetry groove 6902. The rail 2001 and receiving groove 6902 prevent reversed installation of the key card 6903 within the card slot 5901.

Referring now to FIG. 70, a simplified block diagram of the electronic module 400 includes an energy pulse generator 7001, a microprocessor 7002, a transmitter or transceiver 7003, sensors (which in this case are micro switch pushbuttons 402A-402D), and an antenna 7004. Energy from a pulse generated by the energy pulse generator 7001 is routed to both the microprocessor 7002 and the transmitter/transceiver 7003. When powered up, the microprocessor 7002 reads the state of all pushbuttons, and then constructs a data packet containing a 32-bit device address and information bits which identify the pushbuttons which have been activated. Information is also included within the data packet which specifies that the key card is being inserted. The data packet is sent to the transmitter/transceiver 7003 for transmission from antenna 7004. The energy pulse generator 7001 generates a pulse each time there is a flux reversal. Thus when the activator tabs 401A and 401B are depressed, an energy pulse of a first polarity is generated. When the activator tabs 401A and 401B are released, another energy pulse of a second polarity opposite the first is generated. In both cases, the generated pulse is rectified to about a positive 5 volts. Nevertheless, the microprocessor 7002 detects the polarity of each generated pulse and, therefore, can determine whether a key card is being either inserted or removed from the wireless key card sensor unit. When a key card is removed from the slot 5901, a different data packet is transmitted, that omits information about the ON or OFF states of the pushbuttons, and includes information specifying that the key card has been removed.

It should be apparent that the carrier/electronic module/retainer assembly 3700 provides a total of fifteen usable coding patterns: one null switch signal (none of the four switches are activated); four single switch activation signals; six double switch activation signals; and four triple switch activation signals. The single four switch activation signal is indistinguishable from an unpunched card. As this signal can be duplicated with any unpunched card (e.g., a credit card), this signal will likely be considered invalid. The null switch signal is a valid pattern because, even though no activated switch is identified, a radio signal identifying the pattern is, nevertheless, transmitted. In practice, far fewer than fifteen coding patterns are required for the envisioned implementation of the invention.

The coding process works as follows. The card is inserted in the card slot 5901 of the carrier/electronic module/retainer assembly 3700. As the limit of its downward travel is approached, the punch pattern on the card pushes the pushbuttons of none or one to four (preferably one to three) micro switches of the electronic module 400. When the card reaches the limit of its downward travel, or minutely before reaching the limit of its downward travel, the kinetic-energy harvesting electrical power pulse generator within the electronic module 400 is triggered by the resilient activator arms 6004L and 6004R pushing on both activator tabs 401A and 401B. To give the reader a rough idea of the minute amount of energy required to read the pushbutton states, encode a packet, and broadcast it as a radio signal, the energy harvesting pulse generator provides 5 milliamps of current at 5 volts for a total of only about 5 milliseconds. Once the power pulse is generated, a microprocessor reads the state of each of the four micro switches (whether on or off) and generates a data packet containing an address for the module, as well as information relating to the state of each of the micro switches. For a preferred embodiment of the invention, a 32-bit address providing approximately 4 billion different addresses is used. Four data bits are all that are required to represent the state of the buttons. Additional bits for cyclic redundancy check and checksum may also be added to the data packet. The pulse also activates the transmitter 7003 in the module 400, which transmits the data packet. If a receiver is programmed to respond to the address of the module 400, the entire data packet is decoded and the information is used to initiate programmed actions (e.g., turning on the air-conditioning and heating system, activating the television, turning on the lights).

Plastic components are subject to creep (i.e. permanent distortion) when they are under pressure. This is particularly true when the plastic components are subjected to elevated temperatures while under pressure. Although the problem can be ameliorated by using fiber filled plastics, it cannot be eliminated entirely. For an alternative embodiment of the invention which is intended to minimize creep of plastic components when they are under pressure, the apertures or cutouts in various embodiments of the key card can be sized so that when the card is fully inserted, the backing fingers 6001A and 6001B are not being deflected by contact with the rear surface of the key card. Not only does this prevent creep of the plastic backing fingers 6001A and 6001B, it prevents creep of the resilient plastic springs on the micro switch pushbuttons 402A-402D. The pushbuttons 402A-402D are read as the card is being inserted. After it is read, card insertion continues until each plastic backing finger 6001A-6001D (only 6001A and 6001B are fully shown in the drawing figures) until the ramped projections 6001A-6001D (only 6001A and 6001B are fully shown in the drawing figures) rest within an aperture, thereby relieving pressure on the resilient backing fingers 6001A-6001D and on the plastic springs on the micro switch pushbuttons 402A-402D. Thus, each key card has four apertures or cutouts. However, the apertures that are read are shorter than those that are not. The same problems occurs (though to a lesser extent) with the energy bow of the electronic module 400. This problem can be minimized by replacing the standard resilient activator arms 6004L and 6004R with new activator arms that have new ramped projections like the resilient backing fingers 6001A-6001D, so that the new ramped projections on the new activator arms can slide into their own cutouts in the key card after the power pulse has been generated, thereby minimizing creep in the new activator arms and in the energy bow of the electronic module 400.

Figure 72:
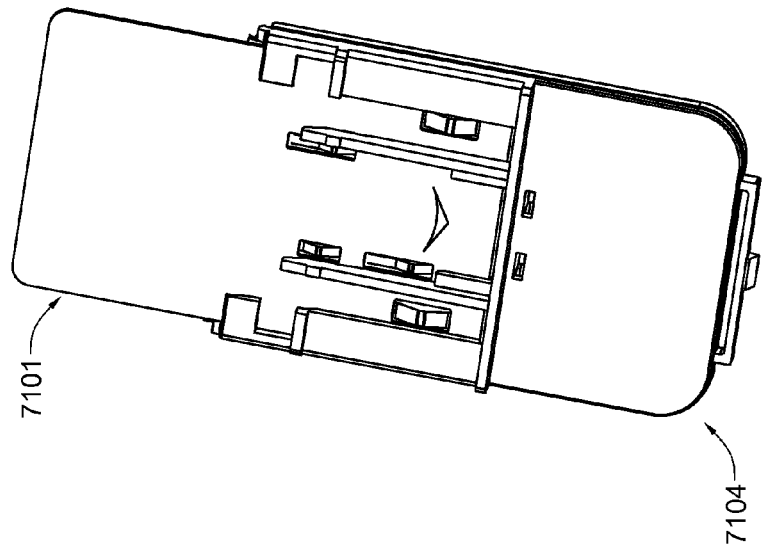
FIG. 72 is an isometric view of the carrier and key card of FIG. 71 after the key card has been inserted into the carrier key card slot.
Figure 71:
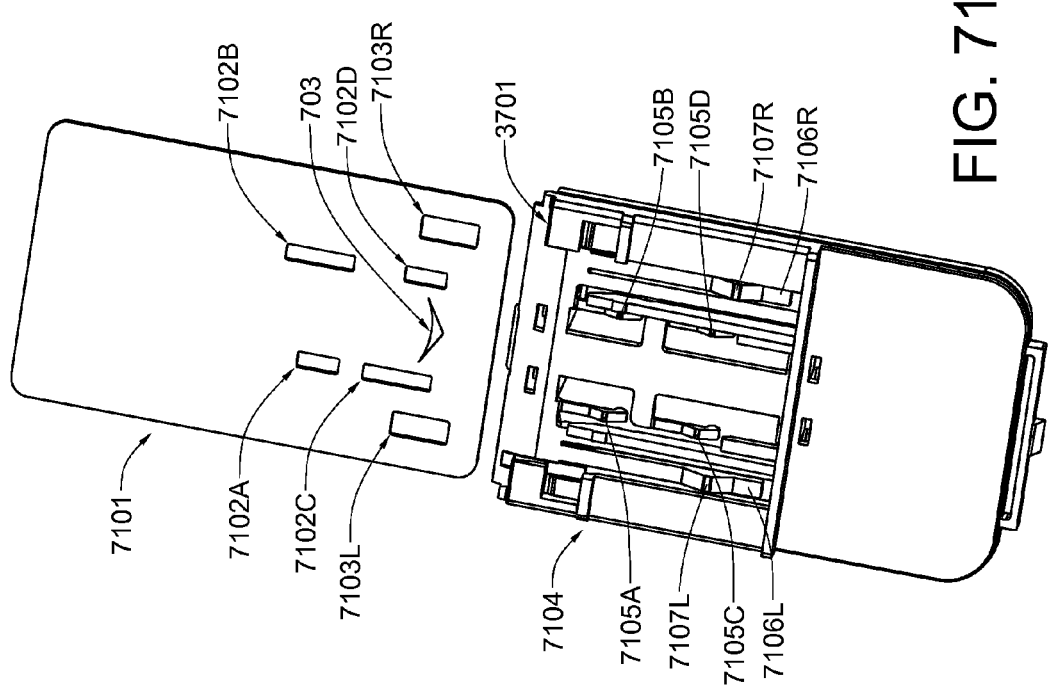
FIG. 71 is an isometric view of the carrier of a coded wireless key card sensor unit and of a key card, both of which are designed to reduce creep of plastic components, prior to its insertion into the carrier slot.

Referring now to FIG. 71, a key card 7101 shows the use of four apertures of two different lengths. Apertures 7102A and 7102D are of standard length, while apertures 7102B and 7102C are of extended length. During insertion of the key card 7101, the pushbuttons 402A and 402D of the electronic module 400, which are associated with apertures 7102A and 7102D will be read as having been pushed during insertion of the key card 7101 into the key card slot 3701. On the other hand, pushbuttons 402B and 402C, which are associated with apertures 7102B and 7102C, will be read as having not been pushed during insertion of the key card 7101. When the key card is fully inserted, as shown in FIG. 72, each of the ramped projections 5001A-6001D are positioned within one of the apertures 7102A-7102D. As there is no pressure on the pushbuttons 402A-402D when the key card 7101 is fully inserted in the key card slot 3701, creep is minimized. This is also true of the resilient backing fingers 7106L and 7106R. After the electrical pulse generator within electronic module 400 has been triggered, the key card 7101 continues to slide to the bottom of the key card slot 3701. At the bottom of the slot, the new ramped projections 7101L and 7107R are positioned within card apertures 7103L and 7103R, thereby relieving pressure on and eliminating creep in the new resilient backing fingers 7106L and 7106R.

The present invention thus provides a coded wireless key card sensor unit that is responsive only to cards which have been specifically programmed for the device with a unique punch code. Thus, a sensor within a key card holder detects not only the insertion or removal of a card, but also looks for the presence of codes punched therein. This enables the generation and transmission of wireless signals which correspond to the particular code which has been programmed into the card. The invention, thus, enables different code sets to be programmed onto a particular key card. Different codes enable the implementation of usage logging as a function of the various available code combinations. For example, different categories of hotel personnel can be issued key cards having different key codes. A key card issued to cleaning employees likely would not be coded for TV or heating/air conditioning system activation. The system can be programmed to trigger an alarm if improperly-coded cards are used at unexpected times. The system can be defeated only by counterfeiting the codes on the card. By using coded key cards, it is possible to keep track of which cards were used and at what times. This gives administrators the ability to track usage. Because the key card holder/detector of the present invention transmits wireless signals, it can be mounted on walls using double sided tape, screws or various other types of fasteners, and without the need for running wires or cutting into walls.

Although only several embodiments of the invention have been described herein, it should be obvious to those having ordinary skill in the art that changes and modifications may be made thereto without departing from the scope and the spirit of the invention as hereinafter claimed. For example, an off-center aperture may be included in the key card which activates a sensor on the electronic module that checks only for proper alignment of the card. If the off-center aperture is not aligned with the sensor, no coding of the punched pattern of holes on the card takes place.

What is claimed is:
1. A wireless key card sensor unit comprising:
  a slot into which a key card, programmed with a pattern of punched apertures, can be inserted; and
  an electronic module having
  an energy harvesting device that generates electrical power in response to insertion of the key card into and retraction of the key card out of said slot;

at least one micro switch, activation of which is determined by a pattern of punched apertures on the key card, upon insertion of the programmed key card into the slot;

circuitry, powered by the generated electrical power, that identifies which of said at least one micro switches have been activated by the inserted programmed card and generates a digital information packet identifying which of said at least one micro switches which have been activated; and a wireless transmitter, powered by the generated electrical power which transmits the digital information packet;

wherein activation of said at least one micro switch occurs prior to generation of electrical power by said energy harvesting device.

2. The wireless key card sensor unit of claim 1, wherein said information packet also contains a unique digital address that identifies the sensor unit.

3. The coded wireless key card sensor unit of claim 1, wherein the key card is punched so that its punched apertures determine activation of said at least one micro switch prior to a triggering of said energy harvesting device by a further insertion of the key card into said slot.

4. The wireless key card sensor unit of claim 1, wherein said at least one micro switch is activated by an absence of an aperture in the key card at a particular location thereon.

5. The wireless key card sensor unit of claim 1, wherein said slot has a physical asymmetry feature that permits the key card to be inserted in only one orientation, thereby eliminating spurious signals caused by reversal of the key card.

6. The wireless key card sensor unit of claim 5, wherein said physical asymmetry feature is a corner filler at the bottom of the slot, which aligns with an asymmetrical chamfer on one corner of the key card when the key card is inserted in a proper orientation.

7. The wireless key card sensor unit of claim 1, wherein said energy harvesting device harvests energy from a force required to insert the key card into the slot.

8. The wireless key card sensor unit of claim 1, wherein said energy harvesting device generates a power pulse when the key card is inserted into the slot and when the key card is removed from the slot, both power pulses being harvested from a force required to slide the key card within the slot.

9. A wireless key card sensor system comprising:
a key card having both magnetic stripe and punched aperture programming;
a wireless key card sensor unit having
a slot into which the key card can be inserted;
an energy harvesting device that generates electrical power in response to a force required to slide the key card into the slot;
a plurality of micro switches selectively activatable by the punched aperture programming of the key card upon insertion of the key card into the slot;
electronic circuitry, powered by the generated electrical power, that identifies which micro switches have been previously activated by the inserted card, and generates a digital information packet identifying the activated micro switches;
a wireless transmitter, powered by the generated electrical power, that transmits the digital information packet.

10. The wireless key card sensor system of claim 9, wherein both said slot and the key card have physical asymmetry features that permit the key card to be inserted in only one orientation, thereby eliminating spurious signals caused by reversal of the key card.

11. The coded wireless key card sensor system of claim 9, wherein the key card is punched so that its punched apertures determine activation of said micro switches prior to a triggering of said energy harvesting device by a further insertion of the key card into said slot.

12. The wireless key card sensor system of claim 9, wherein each of said plurality of micro switches is activated by an absence of an aperture in the key card at a particular location thereon.

13. The wireless key card sensor system of claim 9, wherein:
a resilient backing finger secured to the sensor unit is provided for each micro switch, each backing finger being equipped with a forward-facing ramped projection and a rearward-facing projection that pushes against an activation button of a micro switch if it is rearwardly displaced from a normal, undisplaced position; and
insertion of the key card within the slot applies pressure to each of the ramped projections, causing each of the backing fingers to be rearwardly displaced from its normal, undisplaced position until such time as a punched aperture on the key card associated with that ramped projection may release the pressure on the ramped projection, thereby allowing that ramped projection's associated backing finger and rearward-facing projection to move forward to its normal, undisplaced position so that the rearward-facing projection is no longer pushing against its associated micro switch.

14. The wireless key card sensor system of claim 13, wherein said electronic circuitry is a microprocessor.

15. The wireless key card sensor system of claim 14, wherein the key card is punched in such a manner that as it is inserted into the slot, the following ordered sequence of events occurs:
appropriate micro switches are activated;
the power pulse is generated;
the activated switches are identified by the microprocessor;
the digital information packet is generated; the digital information packet is transmitted by the wireless transmitter; and
as the key card approaches full insertion into the slot, pressure on all resilient backing fingers is released in order to minimize creep of structural polymers from which the resilient backing fingers are made.

16. The wireless key card sensor system of claim 15, wherein release of pressure on all resilient backing fingers is accomplished by providing an aperture into which each ramped projection fits when the key card is fully inserted in the slot.

17. A wireless key card sensor system comprising:
a key card having both a programmable magnetic stripe and punched aperture programming;
a wireless key card sensor unit having
a slot into which the key card can be inserted;
an electrical power pulse generator that harvests kinetic energy from snapping a resilient activator bow that causes a reversal of magnetic flux within a ferrite core of an inductor as it switches states, said snapping triggered by a force required to insert the key card into said slot;
a plurality of micro switches selectively activatable by the punched aperture programming of the key card upon insertion of the key card into the slot;
a microprocessor, powered by power pulses provided by the electrical power pulse generator, that identifies which micro switches have been previously activated by the inserted key card and that generates a digital information packet identifying the activated sensors; and a wireless transmitter, powered by power pulses provided by the electrical power pulse generator, that transmits the digital information packet to a receiver.

18. The wireless key card sensor system of claim 17, wherein both said slot and the key card has physical asymmetry features that permit the key card to be inserted in only one orientation, thereby eliminating spurious signals caused by reversal of the key card.

19. The wireless key card sensor system of claim 17, wherein:
   a resilient backing finger secured to the sensor unit is provided for each micro switch, each backing finger being equipped with a forward-facing ramped projection and a rearward-facing projection that pushes against an activation button of a micro switch if it is rearwardly displaced from a normal, undisplaced position; and
   insertion of the key card within the slot applies pressure to each of the ramped projections, causing each of the backing fingers to be rearwardly displaced from its normal, undisplaced position until such time as a punched aperture on the key card associated with that ramped projection may release the pressure on the ramped projection, thereby allowing that ramped projection's associated backing finger and rearward-facing projection to move forward to its normal, undisplaced position so that the rearward-facing projection is no longer pushing against its associated micro switch.

20. The wireless key card sensor system of claim 14, wherein the key card is punched in such a manner that as it is inserted into the slot, the following ordered sequence of events occurs:
   appropriate micro switches are activated;
   the power pulse is generated;
   the activated switches are identified by the microprocessor;
   the digital information packet is generated;
   the digital information packet is transmitted by the wireless transmitter; and
   as the key card approaches full insertion into the slot, pressure on all resilient backing fingers is released by providing an aperture into which each ramped projection fits when the key card is fully inserted in the slot, thereby minimizing creep of structural polymers from which the resilient backing fingers are made.

* * * * *